US012641509B2

(12) United States Patent
Liu et al.

(10) Patent No.: US 12,641,509 B2
(45) Date of Patent: May 26, 2026

(54) METHOD FOR SENDING HANDOVER SUCCESS REPORT, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Yang Liu, Dongguan (CN); Xue Lin, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 522 days.

(21) Appl. No.: 18/146,745

(22) Filed: Dec. 27, 2022

(65) Prior Publication Data

US 2023/0308981 A1 Sep. 28, 2023

Related U.S. Application Data

(63) Continuation of application No. PCT/CN2020/114001, filed on Sep. 8, 2020.

(51) Int. Cl.
*H04W 36/36* (2009.01)
*H04W 36/00* (2009.01)
*H04W 36/30* (2009.01)

(52) U.S. Cl.
CPC ..... *H04W 36/362* (2023.05); *H04W 36/0058* (2018.08); *H04W 36/00835* (2018.08); *H04W 36/305* (2018.08)

(58) Field of Classification Search
CPC ........... H04W 36/362; H04W 36/0058; H04W 36/00835; H04W 36/305; H04W 36/0083; H04W 24/02; H04W 24/10; H04W 36/24
See application file for complete search history.

(56) References Cited

U.S. PATENT DOCUMENTS

2018/0317137 A1 11/2018 Loehr et al.
2019/0215737 A1 7/2019 Reial et al.
(Continued)

FOREIGN PATENT DOCUMENTS

CN 101366313 A 2/2009
CN 108924890 A 11/2018
(Continued)

OTHER PUBLICATIONS

Ericsson: "Summary of AI 8.13.2-SON, RAN2 scope and requirements", 3GPP Draft; R2-2008288, 3RD Generation Partnership Project (3GPP), Mobilecompetence Centre; 650, Route Des Lucioles; F-06921 Sophia-Antipolis Cedex; France, vol. RAN WG2, No. Electronic meeting; Aug. 17, 2020-Aug. 28, 2020, Sep. 1, 2020 (Sep. 1, 2020), XP052361357, paragraph [2.5.1.1]. 26 pages.

(Continued)

*Primary Examiner* — Hashim S Bhatti

(74) *Attorney, Agent, or Firm* — PERKINS COIE LLP

(57) ABSTRACT

A method for sending a handover success report includes: sending the handover success report in a case that Conditional Handover (CHO) is successful, wherein the handover success report includes at least one of: signal measurement results of neighbor cells by the terminal device; signal measurement results of candidate cells that do not meet a handover condition by the terminal device; a list of candidate cells that meet the handover condition; a list of the candidate cells that do not meet the handover condition; an Identity (ID) of a source cell; information indicating whether (Continued)

300

| Terminal device | | Network device |

S310: first RRC signaling or first MAC CE (information that the terminal device has a handover success report)

S320: second RRC signaling or second MAC CE (request the terminal device to send the handover success report)

S330: third RRC signaling or third MAC CE (handover success report)

a Radio Link Failure (RLF) occurred in the source cell before the terminal device performs the CHO; or a duration from receiving a CHO configuration to triggering the CHO.

20 Claims, 7 Drawing Sheets

(56)                 References Cited

U.S. PATENT DOCUMENTS

| | | | |
|---|---|---|---|
| 2020/0120554 | A1 | 4/2020 | Loehr et al. |
| 2021/0029600 | A1 | 1/2021 | Balan et al. |
| 2022/0141725 | A1 | 5/2022 | Parichehrehteroujeni |
| 2022/0264401 | A1* | 8/2022 | Yan ........................ H04W 76/18 |
| 2023/0040285 | A1* | 2/2023 | Parichehrehteroujeni ................... H04W 36/362 |
| 2023/0262542 | A1* | 8/2023 | Chang ................... H04W 24/02 370/331 |

FOREIGN PATENT DOCUMENTS

| | | |
|---|---|---|
| CN | 110476378 A | 11/2019 |
| CN | 111565426 A | 8/2020 |
| WO | 2019175463 A1 | 9/2019 |
| WO | 2020167237 A1 | 8/2020 |
| WO | 2022031075 A1 | 2/2022 |

OTHER PUBLICATIONS

Supplementary European Search Report in the European application No. 20952689.6, mailed on Sep. 22, 2023. 14 pages.
First Office Action of the Chinese application No. 202310948100.6, issued on Aug. 15, 2024, 15 pages with English translation.
Huawel. "Successful Handovers Reports" 3GPP TSG-RAN3 Meeting #109-e R3-204935, Aug. 6, 2020 (Aug. 6, 2020), sections 1-2.
International Search Report in the international application No. PCT/CN2020/114001, mailed on Jun. 8, 2021.
Written Opinion of the International Search Authority in the international application No. PCT/CN2020/114001, mailed on Jun. 8, 2021.
"3rd Generation Partnership Project; Technical Specification Group Radio Access Network; NR; NR and NG-RAN Overall Description; Stage 2 (Release 16)", 3GPP TS 38.300 V16.2.0, (Jul. 2020), sections 9.2.3.4.2 and 15.5.2.
Huawei, "Successful Handovers Reports", 3GPP TSG-RAN3 Meeting #109-e R3-204935, E-meeting, Aug. 17-28, 2020.
3GPP TS 38.300 V16.2.0, "3rd Generation Partnership Project; Technical Specification Group Radio Access Network; NR; NR and NG-RAN Overall Description; Stage 2 (Release 16)", Technical Specification, (Jul. 2020).

* cited by examiner

100

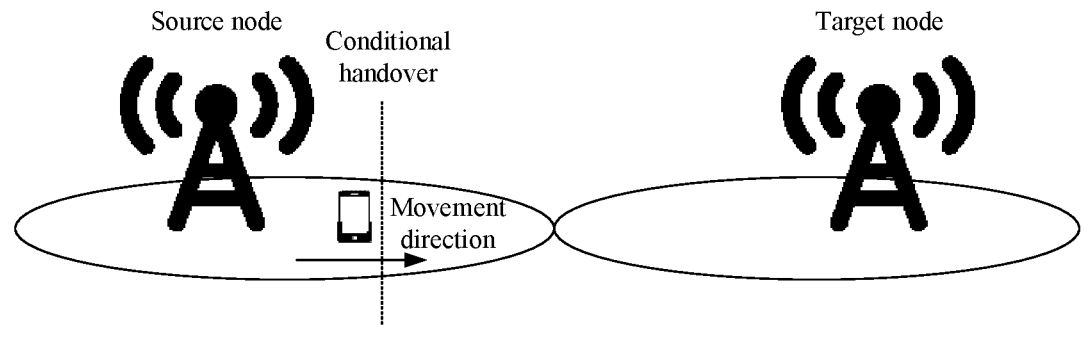

Source node

Conditional handover

Movement direction

Target node

A handover success report is sent in a case that CHO is successful, herein the handover success report includes at least one of:
signal measurement results of neighbor cells by the terminal device;
signal measurement results of candidate cells that do not meet a handover condition by the terminal device;
a list of candidate cells that meet the handover condition;
a list of the candidate cells that do not meet the handover condition;
an ID of a source cell;
information indicating whether an RLF occurred in the source cell before the terminal device performs the CHO; or
a duration from receiving a CHO configuration to triggering the CHO

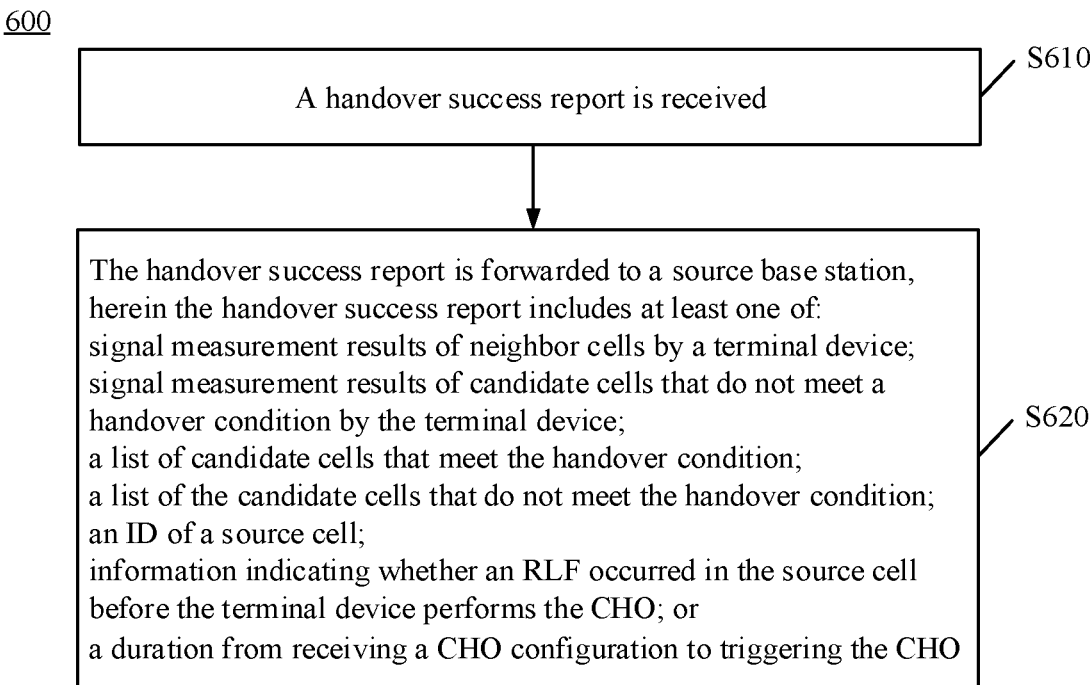

A handover success report is received     S610

The handover success report is forwarded to a source base station, herein the handover success report includes at least one of:
signal measurement results of neighbor cells by a terminal device;
signal measurement results of candidate cells that do not meet a handover condition by the terminal device;
a list of candidate cells that meet the handover condition;
a list of the candidate cells that do not meet the handover condition;
an ID of a source cell;
information indicating whether an RLF occurred in the source cell before the terminal device performs the CHO; or
a duration from receiving a CHO configuration to triggering the CHO     S620

A handover success report of a terminal device is received, herein the handover success report includes at least one of:
signal measurement results of neighbor cells by the terminal device;
signal measurement results of candidate cells that do not meet a handover condition by the terminal device;
a list of candidate cells that meet the handover condition;
a list of the candidate cells that do not meet the handover condition;
an ID of a source cell;
information indicating whether an RLF occurred in the source cell before the terminal device performs the CHO; or
a duration from receiving a CHO configuration to triggering the CHO     S710

FIG. 7

METHOD FOR SENDING HANDOVER SUCCESS REPORT, TERMINAL DEVICE, AND NETWORK DEVICE

CROSS REFERENCE TO RELATED APPLICATION

This is a continuation of International Patent Application No. PCT/CN2020/114001 filed on Sep. 8, 2020, the disclosure of which is hereby incorporated by reference in its entirety.

BACKGROUND

Different from conventional handover, Conditional Handover (CHO) is a cell handover method in which a terminal autonomously determines a handover time and a handover target. In the CHO, after receiving an RRCReconfiguration message that contains a handover configuration, the terminal does not immediately perform handover, but evaluates whether a CHO execution condition is met. If the terminal evaluates that the condition is met, the terminal accesses a target cell. The terminal does not need to inquire whether a source base station allows the handover to be performed.

If the terminal encounters too early handover, for example, a handover fails when the terminal accesses a target node or a Radio Link Failure (RLF) occurred on the target node after a handover is successfully completed, the terminal selects a source cell and initiates re-establishment. After the re-establishment, the terminal sends an RLF report to the source node. The source base station finds that the too early handover occurred, and may change a threshold setting of a measurement object corresponding to a measurement report event of the terminal. This process is referred to as Mobility Robust Optimization (MRO). MRO of the current version does not consider content of a handover success report reported by the terminal after the handover is successful. For the CHO, the content is helpful for a network to adjust configuration parameters, for example, to reduce the number of configured candidate cells.

SUMMARY

The disclosure relates to the field of communications, and in particular, to a method for sending a handover success report, a terminal device, and a network device.

The embodiments of the disclosure provide a method for sending a handover success report, applied to a terminal device and including:

sending the handover success report in a case that CHO is successful, herein the handover success report includes at least one of:

signal measurement results of neighbor cells by the terminal device;

signal measurement results of candidate cells that do not meet a handover condition by the terminal device;

a list of candidate cells that meet the handover condition;

a list of the candidate cells that do not meet the handover condition;

an Identity (ID) of a source cell;

information indicating whether an RLF occurred in the source cell before the terminal device performs the CHO; or a duration from receiving a CHO configuration to triggering the CHO.

The embodiments of the disclosure further provide a terminal device, including:

a transceiver;

a processor; and a memory, configured to store a computer program that, when executed by the processor, causes the processor to control the transceiver to:

send a handover success report in a case that CHO is successful, herein the handover success report includes at least one of:

signal measurement results of neighbor cells by the terminal device;

signal measurement results of candidate cells that do not meet a handover condition by the terminal device;

a list of candidate cells that meet the handover condition;

a list of the candidate cells that do not meet the handover condition;

an ID of a source cell;

information indicating whether an RLF occurred in the source cell before the terminal device performs the CHO; or a duration from receiving a CHO configuration to triggering the CHO.

The embodiments of the disclosure further provide a network device, including:

a transceiver;

a processor; and a memory, configured to store a computer program that, when executed by the processor, causes the processor to control the transceiver to:

receive a handover success report; and forward the handover success report to a source base station, herein the handover success report includes at least one of:

signal measurement results of neighbor cells by a terminal device;

signal measurement results of candidate cells that do not meet a handover condition by the terminal device;

a list of candidate cells that meet the handover condition;

a list of the candidate cells that do not meet the handover condition;

an ID of a source cell;

information indicating whether an RLF occurred in the source cell before the terminal device performs CHO; or a duration from receiving a CHO configuration to triggering the CHO.

BRIEF DESCRIPTION OF THE DRAWINGS

FIG. 1 is a schematic diagram of an application scenario according to an embodiment of the disclosure;

FIG. 2 is a flowchart of a method 200 for sending a handover success report according to an embodiment of the disclosure;

FIG. 6 is a flowchart of a method 600 for sending a handover success report according to an embodiment of the disclosure;

FIG. 7 is a flowchart of a method 700 for receiving and applying a handover success report according to an embodiment of the disclosure;

DETAILED DESCRIPTION

Figure 3:
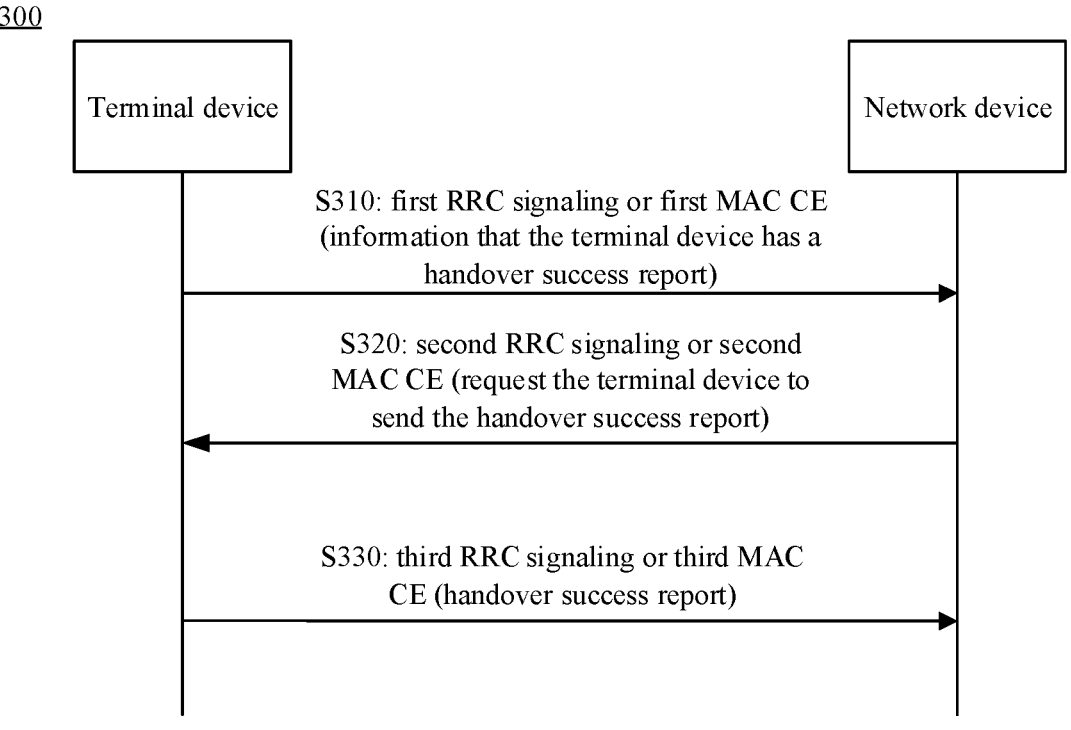
FIG. 3 is a flowchart of a method 300 for sending a handover success report according to an embodiment of the disclosure.

The following describes the technical solutions in the embodiments of the disclosure with reference to the drawings in the embodiments of the disclosure.

It should be noted that the terms "first", "second", and so on in the description and claims of the disclosure and in the above drawings are intended to distinguish between similar objects but do not necessarily indicate a specific order or sequence. In addition, objects described with "first" and "second" in the description may be the same or different.

The technical solutions in the embodiments of the disclosure may be applied to various communication systems, such as a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, a Advanced long term evolution (LTE-A) system, a New Radio (NR) system, an evolved system of the NR system, an LTE-based access to unlicensed spectrum (LTE-U) system, an NR-based access to unlicensed spectrum (NR-U) system, a Universal Mobile Telecommunication System (UMTS), a Wireless Local Area Networks (WLAN), a Wireless Fidelity (Wi-Fi) network, a 5th-Generation (5G) system, or another communication system.

Generally, conventional communication systems support a limited number of connections and are easy to implement. However, with development of communication technologies, mobile communication systems support Device to Device (D2D) communication, Machine to Machine (M2M) communication, Machine Type Communication (MTC), Vehicle to Vehicle (V2V) communication, and the like in addition to conventional communication. The embodiments of the disclosure may also be applied to these communication systems.

Optionally, the communication system in the embodiments of the disclosure may be applied to a Carrier Aggregation (CA) scenario, a Dual Connectivity (DC) scenario, or a Standalone (SA) networking scenario.

A spectrum to which the embodiments of the disclosure are applied is not limited. For example, the embodiments of the disclosure may be applied to a licensed spectrum or an unlicensed spectrum.

The embodiments of the disclosure are described with reference to a network device and a terminal device. The terminal device may also be referred to as User Equipment (UE), an access terminal, a subscriber unit, a subscriber station, a mobile station, a mobile platform, a remote station, a remote terminal, a mobile device, a user terminal, a terminal, a wireless communication device, a user agent, a user apparatus, or the like. The terminal device may be a station in a WLAN; or may be a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, a terminal device in a next-generation communication system such as an NR network or a future evolved Public Land Mobile Network (PLMN), or the like.

By way of example but not limitation, in the embodiments of the disclosure, the terminal device may alternatively be a wearable device. The wearable device may also be referred to as a wearable intelligent device. A wearable technology is used to intelligently design daily wear and develop the wearable device, such as glasses, a glove, a watch, clothing, or shoes. The wearable device is a portable device that is directly worn or integrated into a user's clothing or accessory. The wearable device is not only a hardware device, but also implements powerful functions through software support, data interaction, and cloud interaction. Generalized wearable intelligent devices include full-function and large-size devices that can achieve a complete or partial function without relying on smartphones, such as smart watches or smart glasses, and devices that focus on a specific type of application function and need to be used with smartphones or the like, such as various smart bands or smart jewelry used for sign monitoring.

The network device may be a device configured to communicate with a mobile device. The network device may be an Access Point (AP) in a WLAN, a Base Transceiver Station (BTS) in a GSM or CDMA system, a NodeB (NB) in a WCDMA system, an evolved NodeB (eNB or eNodeB) in an LTE system, a relay station or an AP, a vehicle-mounted device, a wearable device, a gNB in an NR network, a network device in a future evolved PLMN, or the like.

In the embodiments of the disclosure, the network device provides services for a cell. The terminal device communicates with the network device through transmission resources (for example, frequency domain resources or spectrum resources) used by the cell. The cell may be a cell corresponding to the network device (for example, a base station). The cell may belong to a macro base station or a base station corresponding to a small cell. The small cell may include a metro cell, micro cell, pico cell, femto cell, or the like. The small cell features small coverage and low transmission power, and is suitable for providing high-rate data transmission services.

FIG. 1 illustratively shows a terminal device, a source node (source NG-RAN node), and a target node (target NG-RAN node). The source node may be a source base station, and the target node may be a target base station. The terminal device performs CHO from the source base station to the target base station.

Optionally, a wireless communication system 100 may further include other network entities, such as a Mobility Management Entity (MME) and an Access and Mobility Management Function (AMF) entity. This is not limited in the embodiments of the disclosure.

It should be understood that the terms "system" and "network" in this specification can be exchanged. The term "and/or" in this specification merely describes an association relationship between associated objects, and indicates that three types of relationships may exist. For example, A and/or B may indicate that A exists alone, A and B coexist, or B exists alone. In addition, the character "/" in this specification generally indicates that the associated objects are in an "or" relationship.

The embodiments of the disclosure provide a method for sending a handover success report. FIG. 2 is a flowchart of a method 200 for sending a handover success report according to an embodiment of the disclosure. Optionally, the method may be applied to the system shown in FIG. 1, such as the terminal device in the system shown in FIG. 1, but is not limited thereto. The method includes at least part of the following.

In S210, a handover success report is sent in a case that CHO is successful, herein the handover success report includes at least one of:

signal measurement results of neighbor cells by the terminal device;

signal measurement results of candidate cells that do not meet a handover condition by the terminal device;

a list of candidate cells that meet the handover condition;

a list of the candidate cells that do not meet the handover condition;

an ID of a source cell;

information indicating whether an RLF occurred in the source cell before the terminal device performs the CHO; or a duration from receiving a CHO configuration to triggering the CHO.

In the embodiment of the disclosure, the candidate cell may be determined as follows.

After receiving a measurement report of the terminal, a source base station determines possible target cells for the CHO based on the measurement report of the terminal. Then, the source base station negotiates with base stations to which the cells belong to inquire whether the CHO is accepted. If the base station accepts the CHO of the terminal, the base station sends a handover request acknowledgement message to the source base station. The message may also carry information such as an access resource and a bearer configuration for the terminal to access a target cell that belongs to the base station. A cell that accepts the handover of the terminal in the possible target cells is the candidate cell.

Optionally, the signal measurement results of the neighbor cells by the terminal device include signal measurement results of the neighbor cells by the terminal device before the CHO is performed, before the CHO is completed, or before a signal measurement result of at least one candidate cell meets the handover condition.

The signal measurement results of the candidate cells that do not meet the handover condition by the terminal device include signal measurement results of the candidate cells that do not meet the handover condition by the terminal device before the CHO is performed, before the CHO is completed, or before a signal measurement result of at least one candidate cell meets the handover condition.

Optionally, the signal measurement result includes at least one of:

Reference Signal Receiving Power (RSRP);

Reference Signal Receiving Quality (RSRQ); or a Signal to Interference plus Noise Ratio (SINR).

The signal measurement results of the neighbor cells by the terminal device may be expressed in at least the following three forms.

In a first form, the signal measurement results of the neighbor cells by the terminal device include a measurement result of each of the neighbor cells. The measurement result of each of the neighbor cells includes at least one of:

a signal measurement result of the neighbor cell;

an ID of the neighbor cell; or information indicating whether the neighbor cell is a candidate cell.

For example, an identifier is added in measResultNR of the neighbor cell to identify whether the neighbor cell is a candidate cell, as shown in the following example.

```
MeasResultNR ::=                SEQUENCE {
    physCellId                  PhysCellId
OPTIONAL,
    isCandidateCell             boolean{true, false}
    measResult                  SEQUENCE {
        cellResults                 SEQUENCE{
            resultsSSB-Cell             MeasQuantityResults
OPTIONAL,
            resultsCSI-RS-Cell          MeasQuantityResults
OPTIONAL
        },
        rsIndexResults              SEQUENCE{
            resultsSSB-Indexes          ResultsPerSSB-IndexList
OPTIONAL,
            resultsCSI-RS-Indexes       ResultsPerCSI-RS-IndexList
OPTIONAL
        }
OPTIONAL
    },
    ...,
    [[
    cgi-Info                    CGI-InfoNR
OPTIONAL
    ]]
}
```

It can be learned from the foregoing example that an optional identifier, namely, isCandidateCell, is added in measResultNR. Possible values of the identifier are true and false. true indicates that the cell is a candidate cell, and false indicates that the cell is not a candidate cell.

In a second form, the signal measurement results of the neighbor cells by the terminal device include a measurement result list of neighbor cells corresponding to frequencies of different Synchronization Signal Blocks (SSBs) or Channel Status Indicator Reference Signals (CSI-RSs). The measurement result list of the neighbor cells includes a respective signal measurement result of each of the neighbor cells.

Further, the measurement result list of the neighbor cells or the signal measurement result of each of the neighbor cells includes information indicating whether each of the neighbor cells is a candidate cell.

For example, the measurement result list of the neighbor cells is specifically measResultNRList. A bitmap is added to measResultNRList to identify which cells in the list are candidate cells. Each bit in the bitmap corresponds to a cell and is used to indicate whether the cell is a candidate cell. For example, a bitmap containing 6 bits may identify a cell list containing 6 neighbor cells. When the bitmap is 000111, it is identified that the last 3 cells in the list are candidate cells.

In a third form, the signal measurement results of the neighbor cells by the terminal device include a first neighbor cell measurement result list and a second neighbor cell measurement result list.

The first neighbor cell measurement result list includes a signal measurement result of a neighbor cell that is a candidate cell.

The second neighbor cell measurement result list includes a signal measurement result of a neighbor cell that is not a candidate cell.

For example, measResultNeighbourCell is split into measResultCandidateCell and measResultNonCandidateCell. measResultCandidateCell includes the signal measurement result of the neighbor cell that is a candidate cell. measResultNonCandidateCell includes the signal measurement result of the neighbor cell that is not a candidate cell.

Optionally, when the information indicating whether the RLF occurred in the source cell before the terminal device performs the CHO indicates that the RLF occurred, the handover success report further includes at least one of: signal measurement results of candidate cells by the terminal device before the RLF occurred in the source cell, or signal measurement results of the neighbor cells by the terminal device before the RLF occurred in the source cell.

Optionally, when determining that a target base station sends a UE context release message to the source base station, because the source base station cannot know the IDs of the candidate cells, the handover success report may further include a list of the IDs of the candidate cells.

Information contained in the handover success report may be used to help a network adjust configuration parameters. A specific adjustment manner is described in detail in a subsequent method applied to a network device.

The embodiment of the disclosure provides two reporting mechanisms of the handover success report: send the report immediately after the CHO is completed; and send the report after the terminal completes the CHO and enters a stable state. Details are described below.

First Reporting Mechanism

The terminal device sends the handover success report immediately after the CHO is completed. There may be at least the following two implementations.

(1) First Implementation

Sending the handover success report includes the following operations.

The terminal device sends a first Radio Resource Control (RRC) signaling or a first Media Access Control (MAC) Control Element (CE). The first RRC signaling or the first MAC CE carries information that the terminal device has the handover success report.

A second RRC signaling or a second MAC CE is received. The second RRC signaling or the second MAC CE is used in requesting the terminal device to send the handover success report.

The terminal device sends a third RRC signaling or a third MAC CE. The third RRC signaling or the third MAC CE carries the handover success report.

FIG. 3 is a flowchart of a method 300 for sending a handover success report according to an embodiment of the disclosure. As shown in FIG. 3, the method includes the following operations.

In S310, a first RRC signaling or a first MAC CE is sent by a terminal device to a network device (for example, a source base station), herein the first RRC signaling or the first MAC CE carries information that the terminal device has a handover success report.

In S320, a second RRC signaling or a second MAC CE is sent by the network device to the terminal device, herein the second RRC signaling or the second MAC CE is used in requesting the terminal device to send the handover success report.

In S330, a third RRC signaling or a third MAC CE is sent by the terminal device to the network device, herein the third RRC signaling or the third MAC CE carries the handover success report.

Optionally, the first RRC signaling includes RRCReconfigurationComplete signaling.

The second RRC signaling includes InformationRequest.

The third RRC signaling includes InformationResponse.

(2) Second Implementation

Sending the handover success report includes the following operations.

A fourth RRC signaling is received. The fourth RRC signaling instructs the terminal device to send the handover success report through a fifth RRC signaling.

The fifth RRC signaling is sent. The fifth RRC signaling carries the handover success report.

Figure 4:
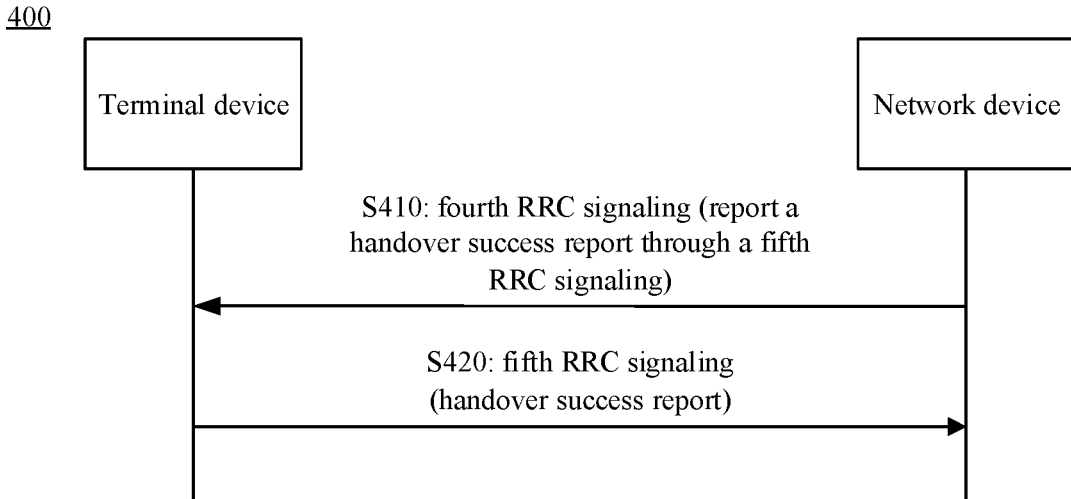
FIG. 4 is a flowchart of a method 400 for sending a handover success report according to an embodiment of the disclosure.

FIG. 4 is a flowchart of a method 400 for sending a handover success report according to an embodiment of the disclosure. As shown in FIG. 4, the method includes the following operations.

In S410, a fourth RRC signaling is sent by a network device (for example, a source base station) to a terminal device, herein the fourth RRC signaling instructs the terminal device to report a handover success report through a fifth RRC signaling.

In S420, the fifth RRC signaling is sent by the terminal device to the network device, herein the fifth RRC signaling carries the handover success report.

Optionally, the fourth RRC signaling includes RRCReconfiguration signaling.

Optionally, the fifth RRC signaling includes RRCReconfigurationComplete signaling.

Second Reporting Mechanism

In an overall process of MRO, if the terminal experiences an RLF shortly after the handover to the target cell, it is considered that too early handover occurred. In this case, the terminal needs to select a cell and perform re-establishment. After the re-establishment, the terminal needs to send a stored RLF report to the target cell. If completion of successful handover means that the terminal can still stably maintain a connection to the target base station after the handover is completed, a time at which the handover success report is sent needs to be changed. In view of this, the embodiments of the disclosure provide the second reporting mechanism. That is, the terminal device sends the handover success report after the CHO is successfully completed.

In conventional handover, a terminal maintains time from handover initialization (for example, receipt of a last RRCReconfiguration message) to a later moment after the handover is started. If the terminal detects an RLF at a moment, the terminal stops maintaining the time, specifies the time in timeConnFailure in an RLF report, and reports the RLF report to a network. After obtaining an Information Element (IE), the network compares the time in timeConnFailure with a threshold Tstore_UE_cntxt to determine whether the terminal experiences too early handover (timeConnFailure<Tstore_UE_cntxt). In the second reporting mechanism provided in the embodiments of the disclosure, a time threshold (T_threahold) may be set. The terminal device or the network records the time. When the recorded time value equals or exceeds T_threahold, the terminal device sends the handover success report.

The second reporting mechanism may be implemented in at least the following two forms.

(1) First implementation: The terminal actively reports the report.

In this implementation, sending the handover success report includes: The terminal device records time from a first start moment, and sends the handover success report through RRC signaling when the recorded time value equals or exceeds a first threshold.

Alternatively, sending the handover success report includes: The terminal device records time from a first start moment, and sends information that the terminal device has the handover success report through RRC signaling or MAC signaling when the recorded time value equals or exceeds a first threshold.

A message used in requesting the terminal device to send the handover success report is received.

The handover success report is sent through RRC signaling.

In this form, the network device that exchanges information with the terminal device may be the source base station.

Optionally, the first start moment may include at least one of:

a moment at which RRC signaling containing a conditional reconfiguration is received;

a moment at which the CHO is started; or a moment at which the CHO is completed.

In some implementations, the moment at which the CHO is started includes at least one of:

a moment at which a CHO execution condition is evaluated to be met; or a moment at which message 1 (Msg1), message 3, or message A of random access, or an RRCReconfigurationComplete message is sent.

In some implementations, the moment at which the CHO is completed includes at least one of:

a moment at which an RRCReconfiguration message, or message 2 or message B of random access is received; or a moment at which an RRCReconfigurationComplete message is sent.

Figure 5:
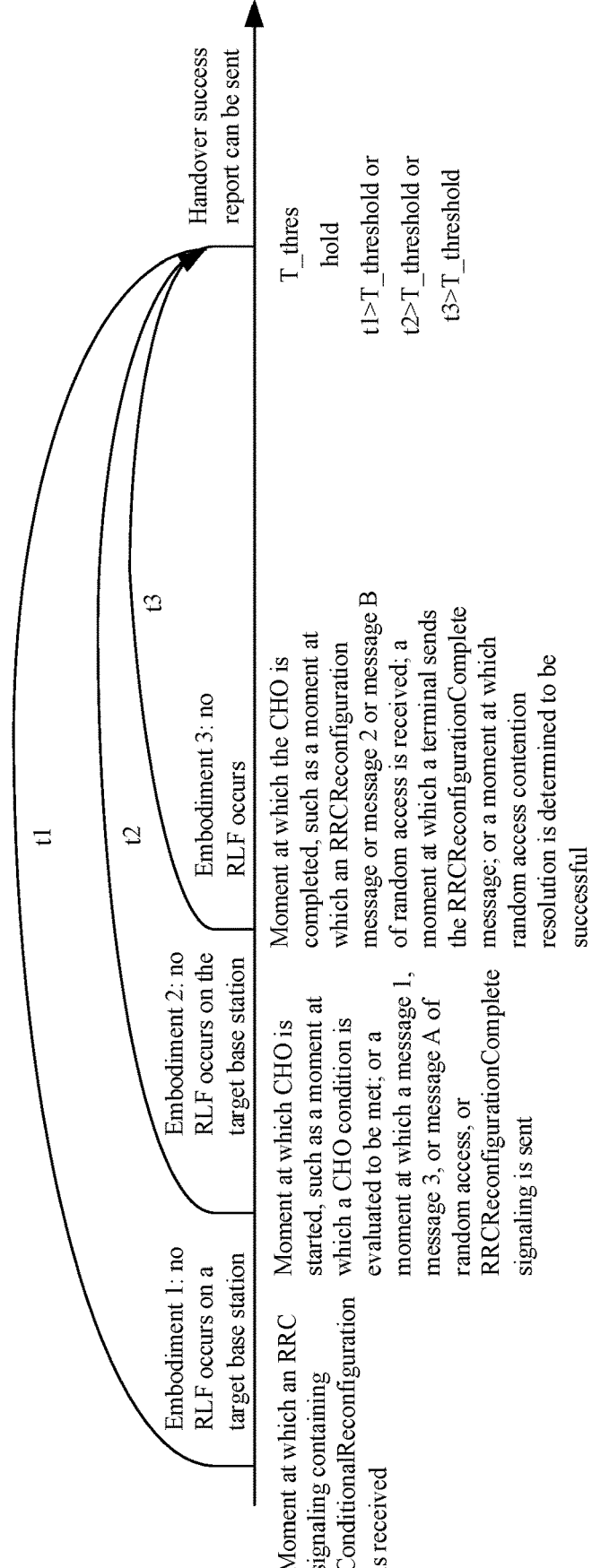
FIG. 5 is a schematic timing diagram for a terminal device to determine whether to send a handover success report in a method for sending a handover success report according to an embodiment of the disclosure.

FIG. 5 is a schematic timing diagram for a terminal device to determine whether to send a handover success report in a method for sending a handover success report according to an embodiment of the disclosure. As shown in FIG. 5, there are at least three possible start moments from which the terminal device records the time: the moment at which the terminal device receives the RRC signaling containing the conditional reconfiguration, the moment at which the CHO is started, and the moment at which the CHO is completed. The three start moments may correspond to different first thresholds (for example, T_threahold). The handover success report may be sent when the time recorded from the start moment equals or exceeds the first threshold.

Optionally, the first threshold is configured by the network device through RRC signaling or maintained by the terminal device.

(2) Second implementation: The network instructs the terminal to send the report.

In this implementation, sending the handover success report includes: An instruction for reporting the handover success report is received, and the handover success report is sent based on the instruction.

Optionally, the instruction for reporting the handover success report is received in a case of meeting a condition including:

the network device records time from a second start moment, and when a recorded time value equals or exceeds a second threshold, the network device does not receive an RRC re-establishment message sent by the terminal device, and does not receive failure indication information about the terminal device or signaling containing RLF information of the terminal device over an Xn or NG interface.

Optionally, the second start moment includes at least one of:

a moment at which RRC signaling containing a conditional reconfiguration is sent;

a moment at which the terminal device is determined to successfully receive the RRC signaling containing the conditional reconfiguration, for example, when the network device receives an ACK message for the RRC signaling containing the conditional reconfiguration;

a moment at which the CHO is started; or a moment at which the CHO is completed.

In some implementations, the moment at which the CHO is started includes a moment at which message 1, message 3, or message A of random access, or an RRCReconfigurationComplete message is received.

In some implementations, the moment at which the CHO is completed includes at least one of:

a moment at which an RRCReconfiguration message, or message 2 or message B of random access is sent;

a moment at which the terminal is determined to successfully receives the RRCReconfiguration message, or the message 2 or message B of the random access; or a moment at which an RRCReconfigurationComplete message is received.

Similarly, there are at least three possible start moments from which the network device records the time: the moment at which the RRC signaling containing the conditional reconfiguration is sent or the terminal device is determined to receive the RRC signaling containing the conditional reconfiguration, the moment at which the CHO is started, and the moment at which the CHO is completed. The three start moments may correspond to different second thresholds (for example, T_threahold). The terminal device may be instructed to send the handover success report when the time recorded from the start moment equals or exceeds the second threshold.

The embodiments of the disclosure further provide a method for sending a handover success report. FIG. 6 is a flowchart of a method 600 for sending a handover success report according to an embodiment of the disclosure. Optionally, the method may be applied to the system shown in FIG. 1, such as the target base station in the system shown in FIG. 1, but is not limited thereto. The method includes at least part of the following.

In S610, a handover success report is received.

In S620, the handover success report is forwarded to a source base station, herein the handover success report includes at least one of:

signal measurement results of neighbor cells by a terminal device;

signal measurement results of candidate cells that do not meet a handover condition by the terminal device;

a list of candidate cells that meet the handover condition;

a list of the candidate cells that do not meet the handover condition;

an ID of a source cell;

information indicating whether an RLF occurred in the source cell before the terminal device performs the CHO; or a duration from receiving a CHO configuration to triggering the CHO.

Optionally, in S610, the source base station receives the handover success report from the terminal device.

Optionally, in S620, the handover success report is forwarded to the source base station through Xn signaling.

In some implementations, the signal measurement results of the neighbor cells by the terminal device include: signal measurement results of the neighbor cells by the terminal device before the CHO is performed, signal measurement results of the neighbor cells by the terminal device before the CHO is completed, or signal measurement results of the neighbor cells by the terminal device before a signal measurement result of at least one candidate cell meets a handover activation condition.

The signal measurement results of the candidate cells that do not meet the handover condition by the terminal device include: signal measurement results of the candidate cells that do not meet the handover condition by the terminal device before the CHO is performed, signal measurement results of the candidate cells that do not meet the handover condition by the terminal device before the CHO is completed, or signal measurement results of the candidate cells that do not meet the handover condition by the terminal device before the signal measurement result of the at least one candidate cell meets the handover activation condition.

Optionally, each of the signal measurement results includes at least one of:

RSRP;

RSRQ; or an SINR.

In some implementations, the signal measurement results of the neighbor cells by the terminal device include a respective measurement result of each of the neighbor cells. The respective measurement result of each of the neighbor cells includes at least one of:

a signal measurement result of the neighbor cell;

an ID of the neighbor cell; or information indicating whether the neighbor cell is a candidate cell.

Optionally, the signal measurement results of the neighbor cells by the terminal device include a measurement result list of neighbor cells corresponding to frequencies of different SSBs or CSI-RSs. The measurement result list of the neighbor cells includes the respective signal measurement result of each of the neighbor cells.

Optionally, the measurement result list of the neighbor cells or the signal measurement result of each of the neighbor cells further includes information indicating whether each of the neighbor cells is a candidate cell.

Optionally, the signal measurement results of the neighbor cells by the terminal device include a first neighbor cell measurement result list and a second neighbor cell measurement result list.

The first neighbor cell measurement result list includes a signal measurement result of at least one neighbor cell that is a candidate cell.

The second neighbor cell measurement result list includes a signal measurement result of at least one neighbor cell that is not a candidate cell.

In some implementations, when indicating that the RLF occurred, the handover success report further includes at least one of: signal measurement results of candidate cells by the terminal device before the RLF occurred in the source cell, or signal measurement results of the neighbor cells by the terminal device before the RLF occurred in the source cell.

In some implementations, when determining that a target base station has sent a UE context release message to a source base station, the handover success report further includes a list of IDs of the candidate cells.

Optionally, when recorded time value equals or exceeds a third threshold, if the target base station does not receive an RLF report sent by the terminal device and does not receive failure indication information about the terminal device sent by another base station, the target base station forwards the handover success report to the source base station. For example, in the first reporting mechanism (the terminal sends the report immediately after the handover is completed), the target base station forwards the handover success report to a base station to which the source cell belongs only when the target base station does not receive the RLF report of the terminal and does not receive the failure indication information about the terminal from another base station subsequently (for example, before T_threshold is reached).

In some implementations, receiving the handover success report in S610 specifically includes the following operations.

A first RRC signaling or a first MAC CE is received. The first RRC signaling or the first MAC CE carries information that the terminal device has the handover success report.

A second RRC signaling or a second MAC CE is sent. The second RRC signaling or the second MAC CE is used in requesting the terminal device to report the handover success report.

A third RRC signaling or a third MAC CE is received. The third RRC signaling or the third MAC CE carries the handover success report.

Optionally, the first RRC signaling includes RRCReconfigurationComplete signaling.

Optionally, the second RRC signaling includes InformationRequest.

Optionally, the third RRC signaling includes InformationResponse.

In some implementations, receiving the handover success report in S610 specifically includes the following operations.

A fourth RRC signaling is sent. The fourth RRC signaling instructs the terminal device to report the handover success report through a fifth RRC signaling.

The fifth RRC signaling is received. The fifth RRC signaling carries the handover success report.

Optionally, the fourth RRC signaling includes RRCReconfiguration signaling.

Optionally, the fifth RRC signaling includes RRCReconfigurationComplete signaling.

In some implementations, receiving the handover success report in S610 specifically includes the following operations.

RRC signaling or MAC signaling is received. The RRC signaling or the MAC signaling carries information that the terminal device has the handover success report.

A message for requesting the terminal device to send the handover success report is sent.

The handover success report is received through RRC signaling.

In some implementations, receiving the handover success report in S610 specifically includes the following operations.

Time is recorded from a second start moment. When a recorded time value equals or exceeds a second threshold, an instruction for reporting the handover success report is sent to the terminal device in response to no RRC re-establishment message sent by the terminal device being received and no failure indication information about the terminal device or signaling containing RLF information of the terminal device being received over an Xn or NG interface.

The handover success report is received.

In S610, a device exchanging information with the target base station may be the terminal device.

Optionally, the second start moment includes at least one of:

a moment at which RRC signaling containing a conditional reconfiguration is sent;

a moment at which the terminal device is determined to successfully receive the RRC signaling containing the conditional reconfiguration;

a moment at which the CHO is started; or a moment at which the CHO is completed.

Optionally, the moment at which the CHO is started includes: a moment at which message 1, message 3, or message A of random access, or an RRC Reconfiguration Complete message is received.

Optionally, the moment at which the CHO is completed includes at least one of:

a moment at which an RRC Reconfiguration message, or message 2 or message B of random access is sent;

a moment at which the terminal device is determined to successfully receive the RRC Reconfiguration message or the message 2 or message B of the random access; or a moment at which an RRC Reconfiguration Complete message is received.

Optionally, the method provided in the embodiment of the disclosure further includes: a reservation duration for access of dedicated resources is optimized based on the duration from receiving the CHO configuration to triggering the CHO.

The embodiments of the disclosure further provide a method for receiving and applying a handover success report. FIG. 7 is a flowchart of a method 700 for receiving and applying a handover success report according to an embodiment of the disclosure. Optionally, the method may be applied to the system shown in FIG. 1, such as the source base station in the system shown in FIG. 1, but is not limited thereto. The method includes at least part of the following.

In S710, a handover success report of a terminal device is received, herein the handover success report includes at least one of:

signal measurement results of neighbor cells by the terminal device;

signal measurement results of candidate cells that do not meet a handover condition by the terminal device;

a list of candidate cells that meet the handover condition;

a list of the candidate cells that do not meet the handover condition;

an ID of a source cell;

information indicating whether an RLF occurred in the source cell before the terminal device performs the CHO; or a duration from receiving a CHO configuration to triggering the CHO.

Optionally, the method may further include: the CHO configuration is optimized based on the handover success report.

In some implementations, the signal measurement results of the neighbor cells by the terminal device include: signal measurement results of the neighbor cells by the terminal device before the CHO is performed, signal measurement results of the neighbor cells by the terminal device before the CHO is completed, or signal measurement results of the neighbor cells by the terminal device before a signal measurement result of at least one candidate cell meets a handover condition.

In some implementations, the signal measurement results of the candidate cells that do not meet the handover condition by the terminal device include: signal measurement results of the candidate cells that do not meet the handover condition by the terminal device before the CHO is performed, signal measurement results of the candidate cells that do not meet the handover condition by the terminal device before the CHO is completed, or signal measurement results of the candidate cells that do not meet the handover condition by the terminal device before the signal measurement result of the at least one candidate cell meets the handover condition.

In some implementations, optimizing the CHO configuration specifically includes the following operation.

Access resources of a candidate cell for which the CHO is not required to be configured are reduced for a first terminal. The first terminal has movement trajectories similar to movement trajectories of the terminal device that sends the handover success report, and/or the first terminal reports measurement reports similar as measurement reports reported by the terminal device that sends the handover success report.

Optionally, the source base station may reduce the access resources of the candidate cell for which the CHO is not required to be configured based on at least one of:

the signal measurement results of the candidate cells that do not meet the handover condition by the terminal device;

the list of the candidate cells that meet the handover condition; or the list of the candidate cells that do not meet the handover condition.

In some implementations, optimizing the CHO configuration specifically includes the following operation.

Access resources of a candidate cell for which the CHO is required to be configured additionally are increased for a first terminal. The first terminal has movement trajectories similar to movement trajectories of the terminal device that sends the handover success report, and/or the first terminal reports measurement reports similar as measurement reports reported by the terminal device that sends the handover success report.

Optionally, the source base station may increase the access resources of the candidate cell for which the CHO is required to be configured additionally based on the signal measurement results of the neighbor cells by the terminal device. For example, if there is a neighbor cell with a large measurement result and the neighbor cell is not in a previously configured candidate cell list, the neighbor cell is added as a candidate cell for subsequent CHO.

In some implementations, optimizing the CHO configuration specifically includes the following operation.

When the RLF occurred in the source cell before the terminal device performs the CHO, and the duration from receiving the CHO configuration to triggering the CHO equals or exceeds a duration threshold, a CHO condition of a target cell is adjusted for a first terminal. The first terminal has movement trajectories similar to movement trajectories of the terminal device that sends the handover success report, and/or the first terminal reports measurement reports similar as measurement reports reported by the terminal device that sends the handover success report.

Optionally, that the source base station adjusts the CHO condition of the target cell may include: The CHO condition of the target cell is adjusted to be more easily met.

Optionally, the source base station may determine a magnitude of adjustment based on a signal measurement result of the source cell by the terminal device when the RLF occurred. For example, if signal quality of the source cell is poor, the magnitude of the condition adjustment is large, such as shortening time-to-trigger or reducing a signal threshold difference between the target cell and the source cell.

In some implementations, optimizing the CHO configuration includes: A CHO start threshold is reduced based on at least one of: the information indicating whether the RLF occurred in the source cell before the terminal device performs the CHO, a signal measurement quantity of the source cell measured before the RLF occurred in the source cell, or consumption measurement quantities of the neighbor cells measured before the RLF occurred in the source cell. The RLF and corresponding cell measurement information can help the source base station more accurately reduce the CHO start threshold to reduce time for the terminal to interrupt a transmission link.

Optionally, the method provided in the embodiment of the disclosure further includes: a desired reservation duration for dedicated resources is negotiated in subsequent handover request signaling based on the duration from receiving the CHO configuration to triggering the CHO.

Figure 8:
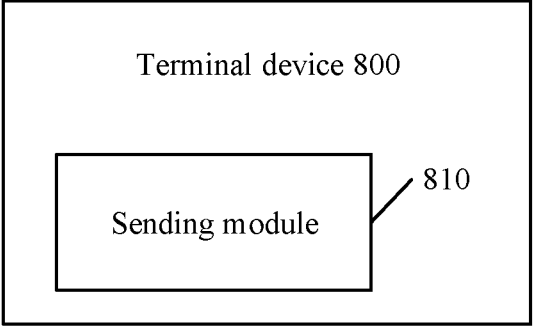
FIG. 8 is a schematic structural diagram of a terminal device 800 according to an embodiment of the disclosure.

The embodiments of the disclosure further provide a terminal device. FIG. 8 is a schematic structural diagram of a terminal device 800 according to an embodiment of the disclosure.

The terminal device includes: a sending module 810, configured to send a handover success report in a case that CHO is successful, herein the handover success report includes at least one of:

signal measurement results of neighbor cells by the terminal device;

signal measurement results of candidate cells that do not meet a handover condition by the terminal device;

a list of candidate cells that meet the handover condition;

a list of the candidate cells that do not meet the handover condition;

an ID of a source cell;

information indicating whether an RLF occurred in the source cell before the terminal device performs the CHO; or a duration from receiving a CHO configuration to triggering the CHO.

In some implementations, the signal measurement results of the neighbor cells by the terminal device include: signal measurement results of the neighbor cells by the terminal device before the CHO is performed, signal measurement results of the neighbor cells by the terminal device before the CHO is completed, or signal measurement results of the neighbor cells by the terminal device before a signal measurement result of at least one candidate cell meets a handover condition.

The signal measurement results of the candidate cells that do not meet the handover condition by the terminal device include: signal measurement results of the candidate cells that do not meet the handover condition by the terminal device before the CHO is performed, signal measurement results of the candidate cells that do not meet the handover condition by the terminal device before the CHO is completed, or signal measurement results of the candidate cells that do not meet the handover condition by the terminal device before the signal measurement result of the at least one candidate cell meets the handover condition.

In some implementations, the signal measurement result includes at least one of:

RSRP;

RSRQ; or an SINR.

In some implementations, the signal measurement results of the neighbor cells by the terminal device include a respective measurement result of each of the neighbor cells, and the respective measurement result of each of the neighbor cells includes at least one of:

a signal measurement result of the neighbor cell;

an ID of the neighbor cell; or information indicating whether the neighbor cell is a candidate cell.

In some implementations, the signal measurement results of the neighbor cells by the terminal device include: a measurement result list of neighbor cells corresponding to frequencies of different SSBs or CSI-RSs. The measurement result list of the neighbor cells includes a respective signal measurement result of each of the neighbor cells.

In some implementations, a measurement result list of the neighbor cells includes information indicating whether each of the neighbor cells is a candidate cell, or the respective signal measurement result of each of the neighbor cells further includes information indicating whether the neighbor cell is a candidate cell.

In some implementations, the signal measurement results of the neighbor cells by the terminal device include: a first neighbor cell measurement result list and a second neighbor cell measurement result list.

The first neighbor cell measurement result list includes a signal measurement result of at least one neighbor cell that is a candidate cell.

The second neighbor cell measurement result list includes a signal measurement result of at least one neighbor cell that is not a candidate cell.

In some implementations, when indicating that the RLF occurred, the handover success report further includes at least one of: signal measurement results of candidate cells by the terminal device before the RLF occurred in the source cell, or signal measurement results of the neighbor cells by the terminal device before the RLF occurred in the source cell.

In some implementations, when determining that a target base station has sent a UE context release message to a source base station, the handover success report further includes a list of IDs of the candidate cells.

In some implementations, sending the handover success report in the case that the CHO is successful includes: sending the handover success report immediately after the CHO is completed.

In some implementations, the sending module 810 is configured to:

send an RRC signaling or a first MAC CE, herein the first RRC signaling or the first MAC CE carries information that the terminal device has the handover success report;

receive a second RRC signaling or a second MAC CE, herein the second RRC signaling or the second MAC CE is used in requesting the terminal device to send the handover success report; and send a third RRC signaling or a third MAC CE, herein the third RRC signaling or the third MAC CE carries the handover success report.

In some implementations, the first RRC signaling includes RRCReconfigurationComplete signaling.

In some implementations, the second RRC signaling includes InformationRequest.

In some implementations, the third RRC signaling includes InformationResponse.

In some implementations, the sending module 810 is configured to:

receive a fourth RRC signaling, herein the fourth RRC signaling instructs the terminal device to send the handover success report through a fifth RRC signaling; and send the fifth RRC signaling, herein the fifth RRC signaling carries the handover success report.

In some implementations, the fourth RRC signaling includes RRCReconfiguration signaling.

In some implementations, the fifth RRC signaling includes RRCReconfigurationComplete signaling.

In some implementations, the sending module 810 is configured to send the handover success report after the CHO is successfully completed.

In some implementations, the sending module 810 is configured to: record time from a first start moment, and send the handover success report through RRC signaling when a recorded time value equals or exceeds a first threshold.

In some implementations, the sending module 810 is configured to:

record time from a first start moment, and send information that the terminal device has the handover success report through RRC signaling or MAC signaling when a recorded time value equals or exceeds a first threshold;

receive a message for requesting the terminal device to report the handover success report; and send the handover success report through RRC signaling.

In some implementations, the first start moment includes at least one of:

a moment at which RRC signaling containing a conditional reconfiguration is received;

a moment at which the CHO is started; or a moment at which the CHO is completed.

In some implementations, the moment at which the CHO is started includes at least one of:

a moment at which a CHO execution condition is evaluated to be met; or a moment at which message 1, message 3, or message A of random access, or an RRC Reconfiguration Complete message is sent.

In some implementations, the moment at which the CHO is completed includes at least one of:

a moment at which an RRC Reconfiguration message, or message 2 or message B of random access is received;

a moment at which an RRC Reconfiguration Complete message is sent; or a moment at which random access contention resolution is determined to be successful or the random access is determined to be successfully completed.

In some implementations, the first threshold is configured by a network device through RRC signaling or is maintained by the terminal device.

In some implementations, the sending module 810 is configured to: receive an instruction for reporting the handover success report, and send the handover success report based on the instruction.

In some implementations, the instruction for reporting the handover success report is received if the following conditions are met.

A network device records time from a second start moment, and when a recorded time value equals or exceeds a second threshold, the network device does not receive an RRC re-establishment message sent by the terminal device, and does not receive failure indication information about the terminal device or signaling containing RLF information of the terminal device over an Xn or NG interface.

In some implementations, the second start moment includes at least one of:

a moment at which RRC signaling containing a conditional reconfiguration is sent;

a moment at which the terminal device is determined to successfully receive the RRC signaling containing the conditional reconfiguration;

a moment at which the CHO is started; or a moment at which the CHO is completed.

In some implementations, the moment at which the CHO is started includes a moment at which message 1, message 3, or message A of random access, or an RRC Reconfiguration Complete message is received.

In some implementations, the moment at which the CHO is completed includes at least one of:

a moment at which an RRC Reconfiguration message, or message 2 or message B of random access is sent;

a moment at which the terminal device is determined to successfully receive the RRC Reconfiguration message, or the message 2 or message B of the random access; or a moment at which an RRC Reconfiguration Complete message is received.

It should be understood that the foregoing description and other operations and/or functions of the module in the terminal device according to the embodiments of the disclosure are for implementing a corresponding process of the terminal device in the method 200 in FIG. 2. For brevity, details are not described herein again.

Figure 9:
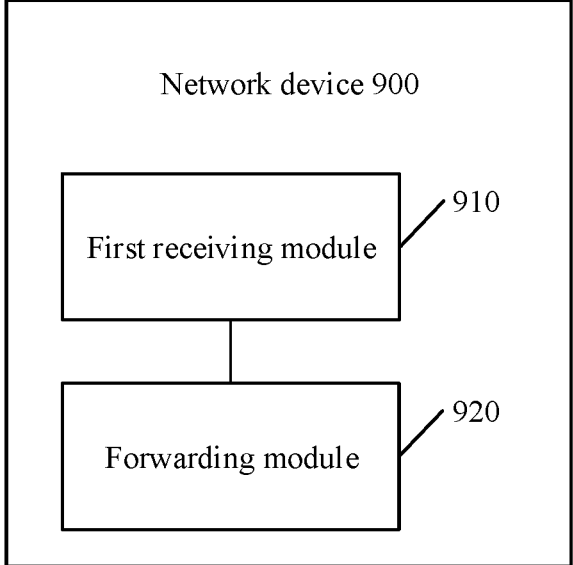
FIG. 9 is a schematic structural diagram of a network device 900 according to an embodiment of the disclosure.

The embodiments of the disclosure further provide a network device. FIG. 9 is a schematic structural diagram of a network device 900 according to an embodiment of the disclosure. The network device 900 includes a first receiving module 910 and a forwarding module 920.

The first receiving module 910 is configured to receive a handover success report.

The forwarding module 920 is configured to forward the handover success report to a source base station. The handover success report includes at least one of:

signal measurement results of neighbor cells by a terminal device;

signal measurement results of candidate cells that do not meet a handover condition by the terminal device;

a list of candidate cells that meet the handover condition;

a list of the candidate cells that do not meet the handover condition;

an ID of a source cell;

information indicating whether an RLF occurred in the source cell before the terminal device performs CHO; or a duration from receiving a CHO configuration to triggering the CHO.

In some implementations, the forwarding module 920 forwards the handover success report to the source base station through Xn signaling.

In some implementations, when a recorded time value equals or exceeds a third threshold, in response to the forwarding module not receiving an RLF report sent by the terminal device and not receiving failure indication information about the terminal device sent by another base station, the forwarding module 920 forwards the handover success report to the source base station.

In some implementations, the first receiving module 910 is configured to:

receive an RRC signaling or an MAC CE, herein the first RRC signaling or the first MAC CE carries information that the terminal device has the handover success report;

send a second RRC signaling or a second MAC CE, herein the second RRC signaling or the second MAC CE is used in requesting the terminal device to report the handover success report; and receive a third RRC signaling or a third MAC CE, herein the third RRC signaling or the third MAC CE carries the handover success report.

In some implementations, the first RRC signaling includes RRCReconfigurationComplete signaling.

In some implementations, the second RRC signaling includes InformationRequest.

In some implementations, the third RRC signaling includes InformationResponse.

In some implementations, the first receiving module 910 is configured to:

send a fourth RRC signaling, herein the fourth RRC signaling instructs the terminal device to report the handover success report through a fifth RRC signaling; and receive the fifth RRC signaling, herein the fifth RRC signaling carries the handover success report.

In some implementations, the fourth RRC signaling includes RRCReconfiguration signaling.

In some implementations, the fifth RRC signaling includes RRCReconfigurationComplete signaling.

In some implementations, the first receiving module 910 is configured to:

receive RRC signaling or MAC signaling, herein the RRC signaling or the MAC signaling carries information that the terminal device has the handover success report;

send a message for requesting the terminal device to report the handover success report; and receive the handover success report through RRC signaling.

In some implementations, the first receiving module 910 is configured to:

record time from a second start moment, and when a recorded time value equals or exceeds a second threshold, send an instruction for reporting the handover success report in response to no RRC re-establishment message sent by the terminal device being received and no failure indication information about the terminal device or signaling containing RLF information of the terminal device being received over an Xn or NG interface; and receive the handover success report.

In some implementations, the second start moment includes at least one of:

a moment at which RRC signaling containing a conditional reconfiguration is sent;

a moment at which the terminal device is determined to successfully receive the RRC signaling containing the conditional reconfiguration;

a moment at which the CHO is started; or a moment at which the CHO is completed.

In some implementations, the moment at which the CHO is started includes: a moment at which message 1, message 3, or message A of random access, or an RRC Reconfiguration Complete message is received.

In some implementations, the moment at which the CHO is completed includes at least one of:

a moment at which an RRC Reconfiguration message, or message 2 or message B of random access is sent;

a moment at which the terminal device is determined to successfully receive the RRC Reconfiguration message or the message 2 or message B of the random access; or a moment at which an RRC Reconfiguration Complete message is received.

Optionally, the network device is further configured to: optimize, based on the duration from receiving the CHO configuration to triggering the CHO, a reservation duration for access of dedicated resources.

It should be understood that the foregoing description and other operations and/or functions of the modules in the network device according to the embodiments of the disclosure are for implementing a corresponding process of the network device in the method 600 in FIG. 6. For brevity, details are not described herein again.

Figure 10:
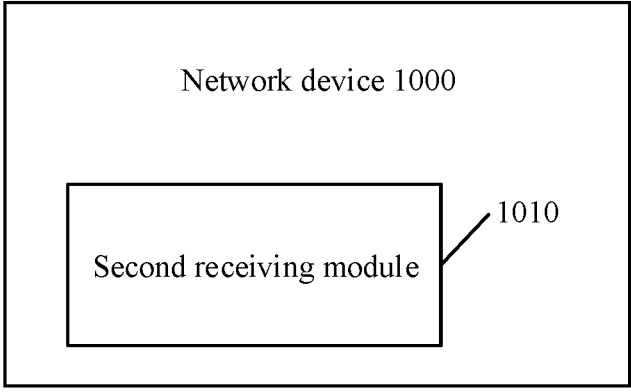
FIG. 10 is a schematic structural diagram of a network device 1000 according to an embodiment of the disclosure.

The embodiments of the disclosure further provide another network device. FIG. 10 is a schematic structural diagram of a network device 1000 according to an embodiment of the disclosure.

The network device includes: a second receiving module 1010, configured to receive a handover success report of a terminal device. The handover success report includes at least one of:

signal measurement results of neighbor cells by the terminal device;

signal measurement results of candidate cells that do not meet a handover condition by the terminal device;

a list of candidate cells that meet the handover condition;

a list of the candidate cells that do not meet the handover condition;

an Identity (ID) of a source cell;

information indicating whether a Radio Link Failure (RLF) occurred in the source cell before the terminal device performs Conditional Handover (CHO); or a duration from receiving a CHO configuration to triggering the CHO.

Figure 11:
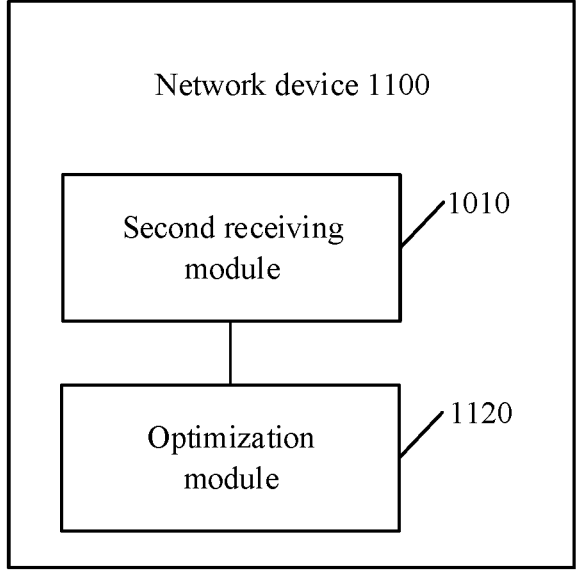
FIG. 11 is a schematic structural diagram of a network device 1100 according to an embodiment of the disclosure.

FIG. 11 is a schematic structural diagram of a network device 1100 according to an embodiment of the disclosure. As shown in FIG. 11, in some implementations, the network device further includes an optimization module 1120.

The optimization module 1120 is configured to optimize the CHO configuration based on the handover success report.

In some implementations, the signal measurement results of the neighbor cells by the terminal device include: signal measurement results of the neighbor cells by the terminal device before the CHO is performed, signal measurement results of the neighbor cells by the terminal device before the CHO is completed, or signal measurement results of the neighbor cells by the terminal device before a signal measurement result of at least one candidate cell meets a handover condition.

The signal measurement results of the candidate cells that do not meet the handover condition by the terminal device include: signal measurement results of the candidate cells that do not meet the handover condition by the terminal device before the CHO is performed, signal measurement results of the candidate cells that do not meet the handover condition by the terminal device before the CHO is completed, or signal measurement results of the candidate cells that do not meet the handover condition by the terminal device before the signal measurement result of the at least one candidate cell meets the handover condition.

In some implementations, the optimization module 1120 is configured to:

reduce, for a first terminal, access resources of a candidate cell for which the CHO is not required to be configured, herein at least one of the following applies: the first terminal has movement trajectories similar to movement trajectories of the terminal device, or the first terminal reports measurement reports similar as measurement reports reported by the terminal device.

In some implementations, the optimization module 1120 reduces the access resources of the candidate cell for which the CHO is not required to be configured based on at least one of:

the signal measurement results of the candidate cells that do not meet the handover condition by the terminal device;

the list of the candidate cells that meet the handover condition; or the list of the candidate cells that do not meet the handover condition.

In some implementations, the optimization module 1120 is configured to:

increase, for a first terminal, access resources of a candidate cell for which the CHO is required to be configured additionally, herein at least one of the following applies: the first terminal has movement trajectories similar to movement trajectories of the terminal device, or the first terminal reports measurement reports similar to measurement reports reported by the terminal device.

In some implementations, the optimization module 1120 increases the access resources of the candidate cell for which the CHO is required to be configured additionally based on the signal measurement results of the neighbor cells by the terminal device.

In some implementations, the optimization module 1120 is configured to:

when the RLF occurred in the source cell before the terminal device performs the CHO, and the duration from receiving the CHO configuration to triggering the CHO equals or exceeds a duration threshold, adjust a CHO condition of a target cell for a first terminal, herein at least one of the following applies: the first terminal has movement trajectories similar to movement trajectories of the terminal device, or the first terminal reports measurement reports similar to measurement reports reported by the terminal device.

In some implementations, the optimization module 1120 adjusts the CHO condition of the target cell to be more easily met.

In some implementations, the optimization module 1120 determines a magnitude of adjustment based on a signal measurement result of the source cell by the terminal device when the RLF occurred.

In some implementations, the optimization module 1120 is configured to:

reduce a CHO start threshold based on at least one of: the information indicating whether the RLF occurred in the source cell before the terminal device performs the CHO, a signal measurement quantity of the source cell measured before the RLF occurred in the source cell, or consumption measurement quantities of the neighbor cells measured before the RLF occurred in the source cell.

Optionally, the network device is further configured to: negotiate, in handover request signaling, a desired reservation duration for dedicated resources based on the duration from receiving the CHO configuration to triggering the CHO.

It should be understood that the foregoing description and other operations and/or functions of the modules in the network device according to the embodiment of the disclosure are for implementing a corresponding process of the network device in the method 700 in FIG. 7. For brevity, details are not described herein again.

Figure 12:
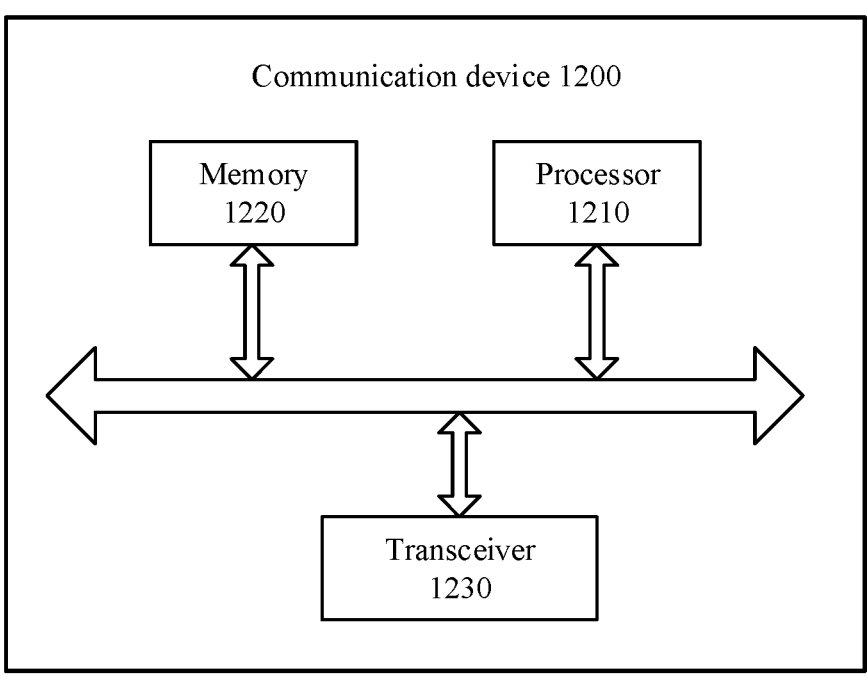
FIG. 12 is a schematic structural diagram of a communication device 1200 according to an embodiment of the disclosure.

FIG. 12 is a schematic structural diagram of a communication device 1200 according to an embodiment of the disclosure. The communication device 1200 shown in FIG. 12 includes a processor 1210. The processor 1210 may call and execute a computer program in a memory to implement the methods in the embodiments of the disclosure.

Optionally, as shown in FIG. 12, the communication device 1200 may further include a memory 1220. The processor 1210 may call and execute a computer program in the memory 1220 to implement the methods in the embodiments of the disclosure.

The memory 1220 may be a component independent from the processor 1210 or may be integrated in the processor 1210.

Optionally, as shown in FIG. 12, the communication device 1200 may further include a transceiver 1230. The processor 1210 may control the transceiver 1230 to communicate with other devices, specifically, to send information or data to other devices or receive information or data sent by other devices.

The transceiver 1230 may include a transmitter and a receiver. The transceiver 1230 may further include one or more antennas.

Optionally, the communication device 1200 may be the terminal device in the embodiments of the disclosure. The communication device 1200 may implement a corresponding process implemented by the terminal device in each method in the embodiments of the disclosure. For brevity, details are not described herein again.

Optionally, the communication device 1200 may be the network device in the embodiments of the disclosure. The communication device 1200 may implement a corresponding process implemented by the network device in each method in the embodiments of the disclosure. For brevity, details are not described herein again.

Figure 13:
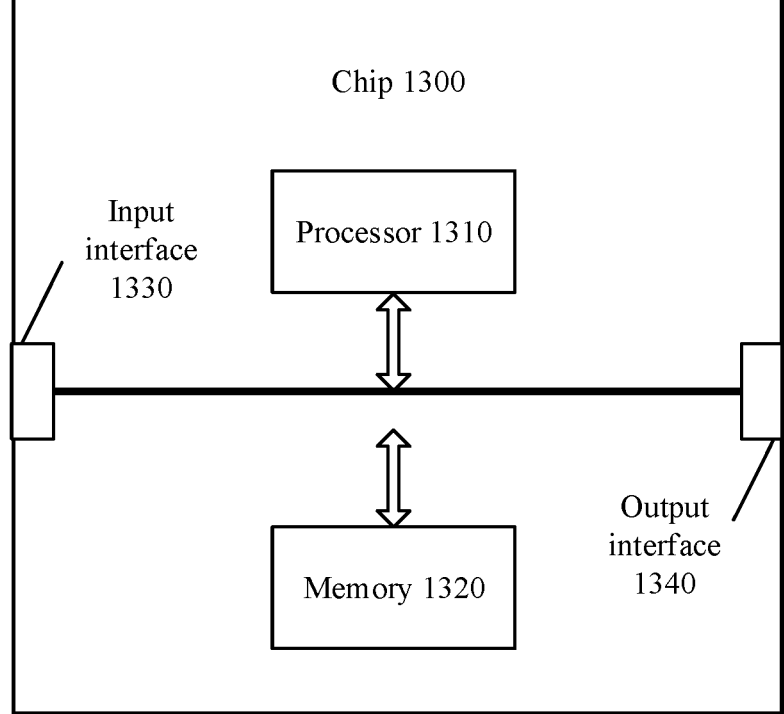
FIG. 13 is a schematic structural diagram of a chip 1300 according to an embodiment of the disclosure.

FIG. 13 is a schematic structural diagram of a chip 1300 according to an embodiment of the disclosure. The chip 1300 shown in FIG. 13 includes a processor 1310. The processor 1310 may call and execute a computer program in a memory to implement the methods in the embodiments of the disclosure.

Optionally, as shown in FIG. 13, the chip 1300 may further include a memory 1320. The processor 1310 may call and execute a computer program in the memory 1320 to implement the methods in the embodiments of the disclosure.

The memory 1320 may be a component independent from the processor 1310 or may be integrated in the processor 1310.

Optionally, the chip 1300 may further include an input interface 1330. The processor 1310 may control the input interface 1330 to communicate with other devices or chips, specifically, to obtain information or data sent by other devices or chips.

Optionally, the chip 1300 may further include an output interface 1340. The processor 1310 may control the output interface 1340 to communicate with other devices or chips, specifically, to output information or data to other devices or chips.

Optionally, the chip may be applied to the terminal device in the embodiments of the disclosure. The chip may implement a corresponding process implemented by the terminal device in each method in the embodiments of the disclosure. For brevity, details are not described herein again.

Optionally, the chip may be applied to the network device in the embodiments of the disclosure. The chip may implement a corresponding process implemented by the network device in each method in the embodiments of the disclosure. For brevity, details are not described herein again.

In the embodiments of the disclosure, the handover success report is sent in the case that the CHO is successful, such that the terminal device reports content of the handover success report after the CHO succeeds. The content is helpful for a network to adjust configuration parameters.

It should be understood that the chip in the embodiment of the disclosure may also be referred to as a system-level chip, a system-on-chip, a chip system, a system on a chip, or the like.

The processor may be a general-purpose processor, a Digital Signal Processor (DSP), a Field-Programmable Gate Array (FPGA), an Application-Specific Integrated Circuit (ASIC) or another programmable logic device, a transistor logic device, a discrete hardware components, or the like. The general-purpose processor may be a microprocessor, any conventional processor, or the like.

The memory may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It should be understood that the foregoing description of the memory is exemplary but not limiting. For example, the memory in the embodiments of the disclosure may alternatively be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), or a Direct Rambus RAM (DR RAM). In other words, the memory in the embodiments of the disclosure is intended to include, but not be limited to, these and any other suitable types of memory.

Some or all of the functions in the foregoing embodiments may be implemented by software, hardware, firmware, or any combination thereof. When software is used to implement the functions, some or all of the functions may be implemented in a form of a computer program product. The computer program product includes one or more computer instructions. When the computer program instructions are loaded and executed on a computer, some or all of the processes or functions according to the embodiments of the disclosure are implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a Digital Subscriber Line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Video Disc (DVD)), a semiconductor medium (for example, a Solid State Disk (SSD)), or the like.

It should be understood that in various embodiments of the disclosure, sequence numbers of the foregoing processes do not imply the order of execution. The order of performing the processes should be determined based on their functions and internal logic, and should not constitute any limitation to the implementation process of the embodiments of the disclosure.

A person skilled in the art can clearly understand that for convenience and brevity of description, reference may be made to corresponding processes in the foregoing method embodiments for specific working processes of the foregoing systems, apparatuses, and units. Details are not described herein again.

The foregoing descriptions are merely specific implementations of the disclosure, but the protection scope of the disclosure is not limited thereto. Any variation or replacement readily figured out by a person skilled in the art within the technical scope disclosed in the disclosure shall fall within the protection scope of the disclosure. Therefore, the protection scope of the disclosure shall be subject to the protection scope of the claims.

The invention claimed is:

1. A method for sending a handover success report, applied to a terminal device, the method comprising:
   sending the handover success report in a case that Conditional Handover (CHO) is successful, wherein the handover success report comprises at least one of:
   signal measurement results of neighbor cells by the terminal device;
   signal measurement results of candidate cells that do not meet a handover condition by the terminal device;
   a list of candidate cells that meet the handover condition;
   a list of the candidate cells that do not meet the handover condition;
   an Identity (ID) of a source cell;
   information indicating whether a Radio Link Failure (RLF) occurred in the source cell before the terminal device performs the CHO; or
   a duration from receiving a CHO configuration to triggering the CHO,
   wherein a first Radio Resource Control (RRC) signaling is sent, the first RRC signaling carrying information that the terminal device has the handover success report; and
   before sending the first RRC signaling, a second RRC signaling is received, the second RRC signaling being used in requesting the terminal device to send the handover success report.

2. The method according to claim 1, wherein sending the handover success report comprises:
   sending, by the terminal device, a first Media Access Control (MAC) Control Element (CE), wherein the first MAC CE carries information that the terminal device has the handover success report;
   receiving a second MAC CE, wherein the second MAC CE is used in requesting the terminal device to send the handover success report; and sending, by the terminal device, a third RRC signaling or a third MAC CE, wherein the third RRC signaling or the third MAC CE carries the handover success report.

3. The method according to claim 2, wherein the first RRC signaling comprises RRCReconfigurationComplete signaling.

4. The method according to claim 2, wherein the second RRC signaling comprises InformationRequest.

5. The method according to claim 2, wherein the third RRC signaling comprises InformationResponse.

6. A terminal device, comprising:

a transceiver;

a processor; and a memory, configured to store a computer program that, when executed by the processor, causes the processor to control the transceiver to:

send a handover success report in a case that Conditional Handover (CHO) is successful, wherein the handover success report comprises at least one of:

signal measurement results of neighbor cells by the terminal device;

signal measurement results of candidate cells that do not meet a handover condition by the terminal device;

a list of candidate cells that meet the handover condition;

a list of the candidate cells that do not meet the handover condition;

an Identity (ID) of a source cell;

information indicating whether a Radio Link Failure (RLF) occurred in the source cell before the terminal device performs the CHO; or a duration from receiving a CHO configuration to triggering the CHO, wherein a first Radio Resource Control (RRC) signaling is sent, the first RRC signaling carrying information that the terminal device has the handover success report; and before sending the first RRC signaling, a second RRC signaling is received, the second RRC signaling being used in requesting the terminal device to send the handover success report.

7. The terminal device according to claim 6, wherein the signal measurement results of the neighbor cells by the terminal device comprise:

signal measurement results of the neighbor cells by the terminal device before the CHO is performed, signal measurement results of the neighbor cells by the terminal device before the CHO is completed, or signal measurement results of the neighbor cells by the terminal device before a signal measurement result of at least one candidate cell meets a handover condition; and the signal measurement results of the candidate cells that do not meet the handover condition by the terminal device comprise: signal measurement results of the candidate cells that do not meet the handover condition by the terminal device before the CHO is performed, signal measurement results of the candidate cells that do not meet the handover condition by the terminal device before the CHO is completed, or signal measurement results of the candidate cells that do not meet the handover condition by the terminal device before the signal measurement result of the at least one candidate cell meets the handover condition.

8. The terminal device according to claim 6, wherein the signal measurement results of the neighbor cells by the terminal device comprise a respective measurement result of each of the neighbor cells, and the respective measurement result of each of the neighbor cells comprises at least one of:

a signal measurement result of the neighbor cell;

an ID of the neighbor cell; or information indicating whether the neighbor cell is a candidate cell.

9. The terminal device according to claim 6, wherein the transceiver is configured to send the handover success report after the CHO is successfully completed.

10. The terminal device according to claim 9, wherein the transceiver is configured to:

record time from a first start moment, and send information that the terminal device has the handover success report through RRC signaling or Media Access Control (MAC) signaling when a recorded time value equals or exceeds a first threshold;

receive a message for requesting the terminal device to report the handover success report; and send the handover success report through RRC signaling.

11. The terminal device according to claim 10, wherein the first start moment comprises at least one of:

a moment at which RRC signaling containing a conditional reconfiguration is received;

a moment at which the CHO is started; or a moment at which the CHO is completed.

12. The terminal device according to claim 10, wherein the first threshold is configured by a network device through RRC signaling or is maintained by the terminal device.

13. A network device, comprising:

a transceiver;

a processor; and a memory, configured to store a computer program that, when executed by the processor, causes the processor to control the transceiver to:

receive a handover success report; and forward the handover success report to a source base station, wherein the handover success report comprises at least one of:

signal measurement results of neighbor cells by a terminal device;

signal measurement results of candidate cells that do not meet a handover condition by the terminal device;

a list of candidate cells that meet the handover condition;

a list of the candidate cells that do not meet the handover condition;

an Identity (ID) of a source cell;

information indicating whether a Radio Link Failure (RLF) occurred in the source cell before the terminal device performs Conditional Handover (CHO); or a duration from receiving a CHO configuration to triggering the CHO, wherein a second Radio Resource Control (RRC) signaling is sent, the second RRC signaling being used in requesting the terminal device to report the handover success report;

after sending the second RRC signaling, a first RRC signaling is received, the first RRC signaling carrying information that the terminal device has the handover success report.

14. The network device according to claim 13, wherein the transceiver is configured to:

receive a first Media Access Control (MAC) Control Element (CE), wherein the first MAC CE carries information that the terminal device has the handover success report;

send a second MAC CE, wherein the second MAC CE is used in requesting the terminal device to report the handover success report; and receive a third RRC signaling or a third MAC CE, wherein the third RRC signaling or the third MAC CE carries the handover success report.

15. The network device according to claim 14, wherein the first RRC signaling comprises RRCReconfiguration-Complete signaling.

16. The network device according to claim 14, wherein the second RRC signaling comprises InformationRequest.

17. The network device according to claim 14, wherein the third RRC signaling comprises InformationResponse.

18. The network device according to claim 13, wherein the transceiver is configured to:

receive RRC signaling or MAC signaling, wherein the RRC signaling or the MAC signaling carries information that the terminal device has the handover success report;

send a message for requesting the terminal device to report the handover success report; and receive the handover success report through RRC signaling.

19. The network device according to claim 13, wherein the transceiver is configured to:

record time from a second start moment, and when a recorded time value equals or exceeds a second threshold, send an instruction for reporting the handover success report in response to no RRC re-establishment message sent by the terminal device being received and no failure indication information about the terminal device or signaling containing RLF information of the terminal device being received over an Xn or NG interface; and receive the handover success report.

20. The network device according to claim 19, wherein the second start moment comprises at least one of:

a moment at which RRC signaling containing a conditional reconfiguration is sent;

a moment at which the terminal device is determined to successfully receive the RRC signaling containing the conditional reconfiguration;

a moment at which the CHO is started; or a moment at which the CHO is completed.

\* \* \* \* \*